United States Patent [19]

Inuzuka

[11] Patent Number: 4,798,370
[45] Date of Patent: Jan. 17, 1989

[54] UPPER SUPPORT FOR A SUSPENSION OF A VEHICLE

[75] Inventor: Yutaka Inuzuka, Nishio, Japan

[73] Assignee: Toyota Jidosha Kabushiki Kaisha, Japan

[21] Appl. No.: 180,138

[22] Filed: Apr. 11, 1988

[30] Foreign Application Priority Data

Apr. 15, 1987 [JP] Japan ............................... 62-55941[U]

[51] Int. Cl.$^4$ ........................... F16F 9/32; B60G 15/06
[52] U.S. Cl. ...................................... 267/220; 280/668
[58] Field of Search ...................... 267/220, 141, 141.4, 267/141.5, 153, 293; 280/668

[56] References Cited

FOREIGN PATENT DOCUMENTS 59-78106  5/1984  Japan .................................. 267/220

Primary Examiner—David M. Mitchell
Assistant Examiner—Karin Ferriter
Attorney, Agent, or Firm—Parkhurst, Oliff & Berridge

[57] ABSTRACT

An upper support for a suspension of a vehicle includes load bearing rubber members which are all used in a compression direction. The support includes an elastic member including first, second and third portions which are used in a compression direction. The upper support is improved in durability, ease in obtaining desired load-deformation characteristics in design, and ease in obtaining soft dynamic vibrational characteristics against bound and rebound loads.

15 Claims, 3 Drawing Sheets

UPPER SUPPORT FOR A SUSPENSION OF A VEHICLE

BACKGROUND OF THE INVENTION

1. Field of the Invention

The present invention relates to an upper support used in a suspension of a vehicle which is provided between a vehicle body and a wheel and includes a shock absorber and a coil spring coaxial with the shock absorber. More particularly, the present invention relates to an upper support in which load bearing rubber members are used in a compression direction to avoid shear.

2. Description of the Related Art

A typical suspension including an upper support, a shock absorber and a coil spring is disclosed in Japanese Utility Model Publication SHO Pat. No. 59-78106. FIG. 2 illustrates a general arrangement of a suspension in a vehicle; FIG. 3 illustrates the upper support disclosed in Japanese Utility Model Publication SHO Pat. No. 59-78106; and FIG. 4 illustrates a load-deformation characteristic of the upper support of FIG. 3.

In FIG. 2, a rear axle beam 51 which supports wheels at both end portions thereof is supported by a vehicle body by means of (a) a suspension arm 52 which is pivotally connected to the vehicle body at one end of suspension arm 52 and is coupled to rear axle beam 51 at another end of suspension arm 52 and (b) a shock absorber 53 and a coil spring 54 provided coaxial with shock absorber 53. The upper end portions of shock absorber 53 and coil spring 54 are coupled via an upper support, for example, an upper support 60 of FIG. 3 to the vehicle body.

As shown in FIG. 3, upper support 60 comprises: a first member 63 including a flange portion 62; a second member 67 including a first cylindrical portion 64 having a small diameter and a second cylindrical portion 65 having a large diameter and a spring seat portion 66; and a third member 68 located inside the first cylindrical portion 64. Upper support 60 further comprises: an inside rubber layer 70 located between and connected by means of vulcanization to second and third members 67 and 68 and contacting a lower retainer 69 at a lower end of inside rubber layer 70; an outside rubber layer 71 located between, and connected by means of vulcanization to first and second members 63 and 67; a rubber seat 72 fixed by means of vulcanization to a lower surface of spring seat portion 66 of second member 67; and a rubber seal 73 connected by means of vulcanization to an outside surface of first member 63.

In upper support 60 of FIG. 3, loads from a coil spring 54 (FIG. 2) are supported, via rubber seat 72, second member 67, outside rubber layer 71 and first member 63, and finally by a vehicle body 61. Loads from a shock absorber 53 are divided into two kind of loads, bound loads caused when an absorber rod moves upward relative to the vehicle body and rebound loads caused when the absorber rod moves downward relative to the vehicle body. A large portion of the bound loads is transmitted from third member 68 to inside rubber layer 70 and from inside rubber layer 70 to second member 67, accompanied with a shear deformation of inside rubber layer 70. A small portion of the bound loads is transmitted from lower retainer 69 via a lower portion of inside rubber layer 70 to second member 67, accompanied with a compression deformation of a lower portion of inside rubber layer 70. The bound loads which have been transmitted to second member 67 are transmitted from second member 67 via outside rubber layer 71 to first member 63, accompanied with shear and compression deformations of outside rubber layer 71, and are finally supported by vehicle body 61. Rebound loads from shock absorber 53 are entirely transmitted from third member 68 via inside rubber layer 70 to second member 67, accompanied with a shear deformation of inside rubber layer 70. The rebound loads which have been transmitted to second member 67 are further transmitted from second member 67 via outside rubber layer 71 to first member 63, accompanied with shear and tension-compression deformations of outside rubber layer 71 and are finally supported by vehicle body 61. Because inside rubber layer 70 is used in shear and large tensile stresses remain at a radially inner portion of inside rubber layer 70 due to the vulcanization of inside rubber layer 70 to third member 68, and because rubber is much weaker against repeated loads of shear and tension than against repeated loads of compression, third member 68 is radially expanded after vulcanization to put the radially inner portion of inside rubber layer 70 in a pre-compressed state.

FIG. 4 illustrates a characteristic A of upper support 60 against loads from a coil spring and a characteristic B of upper support 60 against loads from a shock absorber. As will be understood from FIG. 4, a spring constant of an assembly of inside and outside rubber layers 70 and 71 against the loads from the absorber rod which usually have small vibrational amplitudes is set small to provide a soft cushion, while a spring constant of outside rubber layer 71 against the loads from the coil spring which usually have large vibrational amplitudes is set large to suppress a noise. The small spring constant of the assembly of inside and outside rubber layers 70 and 71 is mainly obtained through a shear deformation of inside rubber layer 70, because spring constants of rubber decreases in the order of compression, tension and shear.

However, there are the following drawbacks in a prior art upper support, such as upper support 60 of FIG. 3.

Firstly, durability of upper support 60 is not great because inside rubber layer 70 of upper support 60 is used in shear and rubber is very weak against shear.

Secondly, a load-deformation characteristic of inside rubber layer 70 in an axial direction receives a limitation in designing the characteristic of inside rubber layer 70 sufficiently soft, because a large axial deformation of inside rubber layer 70 due to shear deformation deteriorates durability of inside rubber layer 70. This means that soft cushion obtained through shear deformation of inside rubber layer 70 and durability of upper support 60 are not compatible with each other in the prior art upper support.

Thirdly, to maintain a necessary durability for upper support 60, it is necessary to use a considerably hard rubber for inside rubber layer 70 which is effective to suppress an axial shear deformation amount of inside rubber layer 70 to a small one. However, the hard rubber increases a ratio of a dynamic spring constant to a static spring, constant of rubber, and damping of rubber acts greatly in a dynamic deformation. This means a dynamic load-deformation characteristic of upper support 60 becomes hard to a considerably great extent, which decreases soft cushion of upper support 60 and noise suppression effect of upper support 60.

Fourthly, since third member 68 must be radially expanded after vulcanization between inside rubber layer 70 and third member 68 to give pre-compression to the radially inner portion of inside rubber layer where tensile stresses due to a shrinkage after the vulcanization have been caused, the expansion process is added to a manufacturing process of upper support 60, which increases manufacturing costs of upper support 60.

OBJECTS AND SUMMARY OF THE INVENTION

A first object of the present invention is to provide an upper support for a suspension wherein rubber members of the upper support are used in compression to increase durability of the upper support.

A second object of the present invention is to provide an upper support wherein a soft load-deformation characteristic in an axial direction against loads from an absorber rod and durability of the upper support are compatible with each other, that is, a load-deformation characteristic of rubber members is not limited by durability of the upper support.

A third object of the present invention is to provide an upper support wherein it is possible to use a soft rubber without deteriorating durability of the upper support and, as a result, to obtain a sufficiently soft cushion effect and a high noise suppression effect of an upper support.

A fourth object of the present invention is to provide an upper support wherein it is possible to delete an expansion process of a metal member after vulcanization between a metal member and a rubber member.

The above objects can be achieved by the following upper support for a suspension of a vehicle in accordance with the present invention:

An upper support for a suspension located between a vehicle body and a wheel and including a shock absorber and a coil spring, the upper support, the shock absorber and the coil spring having a common axis, the upper support comprising:

a first generally annular rigid member including a substantially cylindrical portion and a flange portion extending radially outward from a lower end portion of the substantially cylindrical portion, the upper support being fixed to the vehicle body at the flange portion;

a second generally annular rigid member arrange below the first rigid member in an axial direction and including: a substantially flat portion extending perpendicular to the axis of the upper support and having an inner diameter smaller than an inner diameter of the first rigid member; a substantially conically extending portion extending obliquely downward from a radially outer end portion of the substantially flat portion and having an outer diameter larger than the inner diameter of the first rigid member; a substantially cylindrical portion extending downward from a lower end portion of the substantially conically extending portion; and a spring seat portion extending radially outward from a lower end portion of the substantially cylindrical portion;

a generally annular elastic member elastically connecting the first and second rigid members and having a radially inner slidable surface for slidably contacting the collar coupled to the absorber rod of the shock absorber, the elastic member including: a first portion provided between the first rigid member and the substantially conically extending portion of the second rigid member in the axial direction and fixed to the first and second rigid members; a second portion provided above and fixed to the substantially flat portion of the second rigid member, the second portion being compressed in the axial direction between the substantially flat portion of the second rigid member and an upper retainer to be coupled to the absorber rod in the axial direction; and a third portion provided below and fixed to the substantially flat and substantially conically extending portions of the second rigid member, the third portion being compressed in the axial direction between the substantially flat and substantially conically extending portions of the second rigid member and a lower retainer to be coupled to the absorber rod in the axial direction, each of the first, second and third portions being used in a compression direction; and an elastic seat fixed to a lower surface of the spring seat portion of the second rigid member to receive loads from the coil spring.

In the upper support thus constructed, loads from a coil spring which have been transmitted from the coil spring via the elastic seat to the second rigid member are transmitted through a compression deformation of the first portion of the elastic member to the first rigid member and finally to a vehicle body. Loads from an absorber rod of a shock absorber are divided to two kind of loads, bound loads caused when the absorber rod moves upward relative to the vehicle body and rebound loads caused when the absorber rod moves downward relative to the vehicle body. Bound loads from a lower retainer coupled to the absorber rod are transmitted from the lower retainer through compression deformation of the third portion of the elastic member to the second rigid member and from the second rigid member through a compression deformation of the first portion of the elastic member to the first rigid member and are finally transmitted to the vehicle body. Rebound loads from an upper retainer coupled to the absorber rod are transmitted from the upper retainer through a compression deformation of the second member to the second rigid member and from the second rigid member through a deformation of the first portion of the elastic member to the first rigid member and are finally transmitted to the vehicle body. The deformation of the first portion of the elastic member in transmission of the rebound loads is maintained in compression because always-acting loads from the coil spring are greater than the rebound loads. No shear deformation is produced in the elastic members because the radially inner surface slidably contacts the collar. As a result, all portions of the elastic member including the first, second and third portions always operate in a compression direction.

The use of the elastic member in compression causes the following additional subsidiary effects:

The load-deformation characteristics of the first, second and third portions of the elastic member can be determined without being affected by durability. The load-deformation characteristic against loads from an absorber rod including bound and rebound loads can be easily designed soft, because the spring constants in compression of the first, second and third portions of the elastic member can be determined independently of each other. Such a soft characteristic improves the cushion of a vehicle.

Since a hardness of rubber is not required to be high because the characteristic of the second and third portions of the elastic member can be easily designed soft by providing a rubber deformation absorbing means to the portions (provision of such means is possible in an upper support wherein the rubber member is not fixed to a collar), a ratio of a dynamic spring constant to a static spring constant is kept low, which improves vibrational and noise suppression effects of a suspension.

Since the collar is not required to be expanded, a expansion process can be deleted from a manufacturing process of an upper support, which decreases manufacturing costs.

BRIEF DESCRIPTION OF THE DRAWINGS

These and other objects of the present invention will become more apparent and more readily appreciated from the following detailed description of the preferred exemplary embodiment of the invention taken in conjunction with the accompanying drawings, of which.

DETAILED DESCRIPTION OF THE PREFERRED EMBODIMENT

Figure 1:
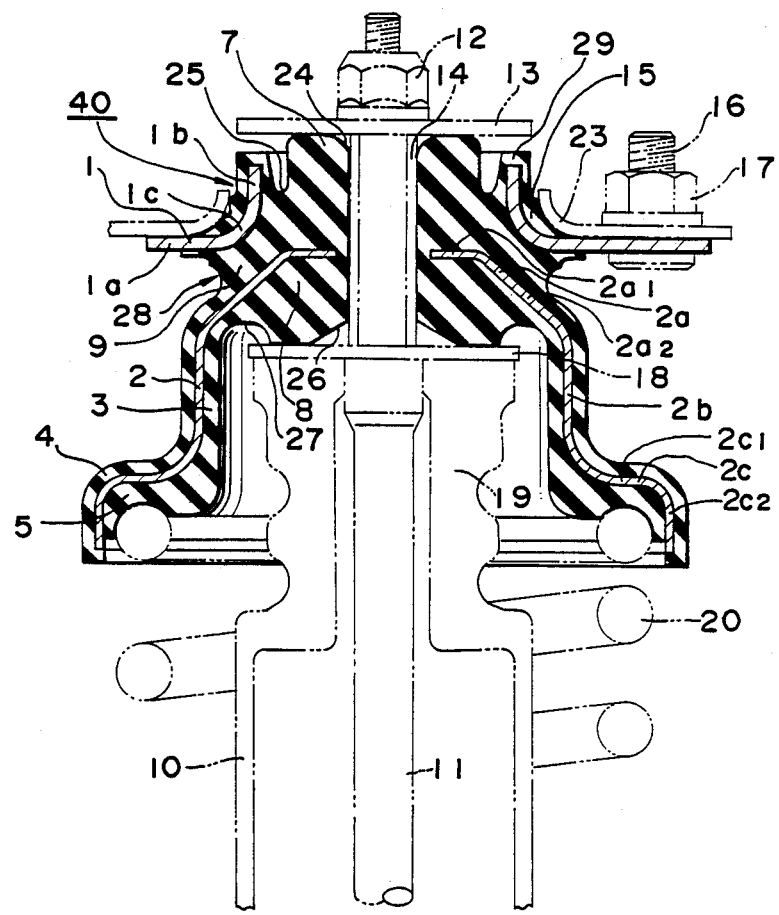
FIG. 1 is a sectional view of an upper support for a suspension of a vehicle according to one embodiment of the present invention.
Figure 2:
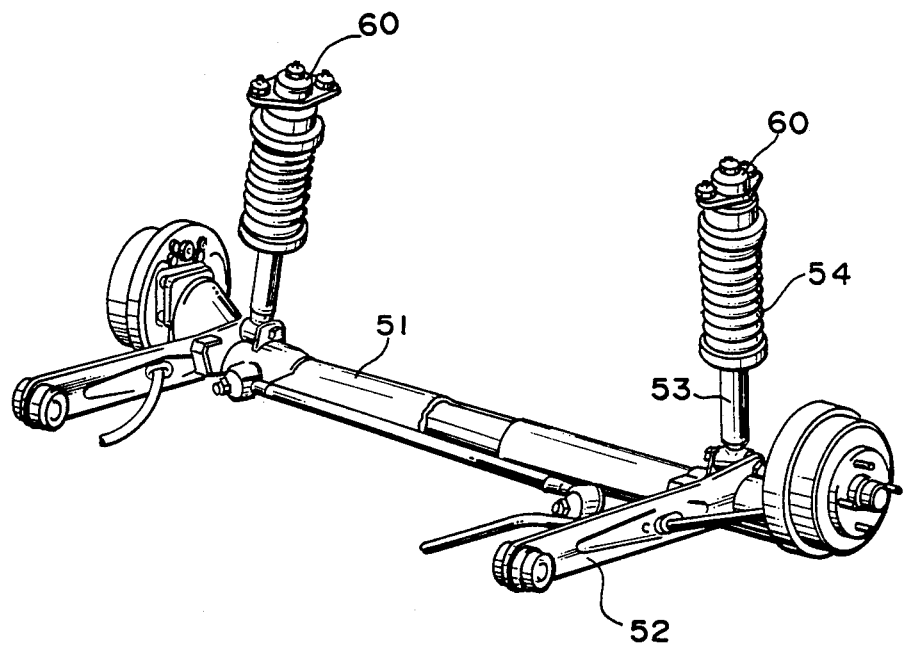
FIG. 2 is an oblique view illustrating a general arrangement of a conventional suspension including an shock absorber and a coil spring in a vehicle.
Figure 3:
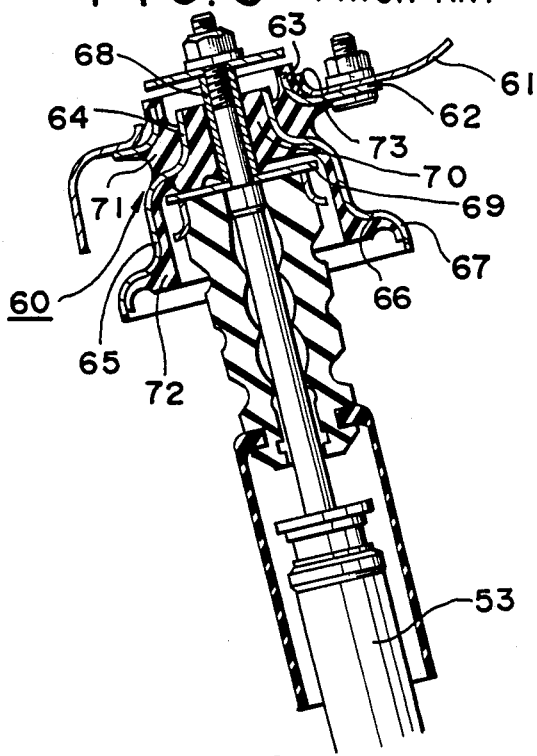
FIG. 3 is a sectional view of a prior art upper support which is disclosed in Japanese Utility Model Publication SHO Pat. No. 59-78106.
Figure 4:
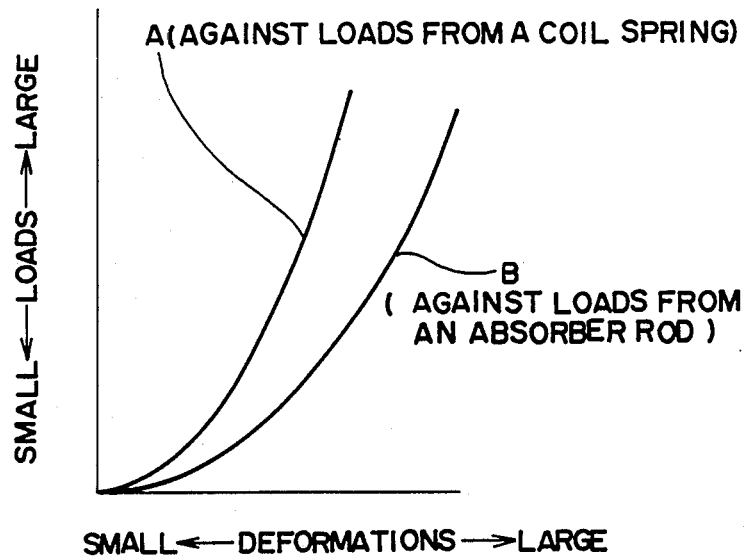
FIG. 4 is a graph illustrating a load-deformation characteristic of the upper support of FIG. 3.

FIG. 1 illustrates an upper support 40 used in a suspension of a vehicle according to one embodiment of the present invention. The suspension is provided between a vehicle body 23 and a wheel and includes upper support 40, a shock absorber (only an absorber rod 11 is shown in FIG. 1) and a coil spring 20. Upper support 40 is provided between vehicle body 23 and the shock absorber and coil spring 20 and elastically connects the upper end portions of absorber rod 11 and coil spring 20 to vehicle body 23. In FIG. 1, upper support 40 is shown by a full line and members other than upper support 40 including the shock absorber and coil spring 20 are shown by a two-dotted chain line. Upper support 40, the shock absorber and coil spring 20 have a common axis which extends in a substantially vertical direction.

Upper support 40 comprises a first generally annular rigid member 1, a second generally annular rigid member 2 formed separate from first rigid member 1, a generally annular elastic member 28 elastically connecting first and second rigid members 1 and 2, and a generally annular elastic seat 5 fixed to a lower end portion of second rigid member 2. The first and second rigid members 1 and 2 are preferably constructed of metal, for example, steel, and elastic member 28 and elastic seat 5 are preferably constructed of rubber.

First rigid member 1 includes a substantially cylindrical portion 1b, and a flange portion 1a extending radially outward from a lower end portion of substantially cylindrical portion 1b. First rigid member 1 further includes a curved portion 1c, and substantially cylindrical portion 1b and flange portion 1a are connected to each other via curved portion 1c. Upper support 40 is fixed to vehicle body 23 at flange portion 1a by means of a bolt 16 and a nut 17.

Second rigid member 2 includes a substantially flat portion $2a_1$, a substantially conically extending portion $2a_2$, a substantially cylindrical portion 2b and a spring seat portion 2c. Substantially flat portion $2a_1$ extends perpendicular to the axis of upper support 40. Substantially flat portion $2a_1$ has an inner diameter smaller than an inner diameter of first rigid member 1 and larger than an outer diameter of a collar 14 coupled to absorber rod 11; and has an outer diameter smaller than the inner diameter of first rigid member 1. Substantially conically extending portion $2a_2$ extends obliquely downward from a radially outer end portion of substantially flat portion $2a_1$. Substantially conically extending portion $2a_2$ may extend substantially perpendicular to the axis of the upper support when first rigid member 1 is located sufficiently higher than second rigid member 2. Substantially conically extending portion $2a_2$ has an inner diameter adjacent flat portion $2a_1$ smaller than the inner diameter of first rigid member 1 and an outer diameter adjacent cylindrical portion 2b larger than the inner diameter of first rigid member 1. Substantially cylindrical portion 2b extends axially downward from a lower end portion of substantially conically extending portion $2a_2$. Substantially cylindrical portion 2b has a diameter larger than the inner diameter of first rigid member 1 and smaller than an outer diameter of first rigid member 1. Spring seat portion 2c extends radially outward from a lower end portion of substantially cylindrical portion 2b. Spring seat portion 2c includes a radially extending portion $2c_1$ and an axially extending portion $2c_2$. The portions $2a_1$, $2a_2$, 2b, $2c_1$ and $2c_2$ are smoothly connected via curved portions to an adjacent one of the portions.

Elastic member 28 includes a first portion 9, a second portion 7 and a third portion 8. Second portion 7 is located radially inside first portion 9 and third portion 8 is located below second portion 7. A radially inner surface of elastic member 28 slidably contacts collar 14 coupled to absorber rod 11 of the shock absorber, that is, the radially inner surface of elastic member 28 is not fixed by means of vulcanization to collar 14. First portion 9 is provided between first rigid member 1 and substantially conically extending portion $2a_2$ of second rigid member 2 in the axial direction and extends raially outward and obliquely downward. First portion 9 is fixed to first and second rigid members 1 and 2 by means of vulcanization. Second portion 7 is provided above substantially flat portion $2a_1$ of second rigid member 2 and extends axially upward from an upper surface of substantially flat portion $2a_1$ of second rigid member 2. Second portion 7 is fixed to substantially flat portion $2a_1$ of second rigid member 2 and contacts (accordingly, is not fixed to) an upper retainer 13 coupled to absorber rod 11 by a nut 12. Second portion 7 is squeezed between substantially flat portion $2a_1$ of second rigid member 2 and upper retainer 13 coupled to absorber rod 11 in the axial direction. Third portion 8 is provided below substantially flat portion $2a_1$ and substantially conically extending portions $2a_2$ of second rigid member 2 and is fixed to substantially flat and substantially conically extending portions $2a_1$ and $2a_2$ of second rigid member 2. Third portion 8 is squeezed between substantially flat and substantially conically extending portions $2a_1$ and $2a_2$ of second rigid member 2 and a lower retainer 18 coupled to absorber rod 11 in the axial direction. Each of first, second and third portions 9, 7 and 8 is used in a compression direction.

Elastic seat 5 is fixed to a lower surface of spring seat portion 2c of second rigid member 2 to bear loads from coil spring 20 in a compression direction. More particularly, elastic seat 5 is fixed to a lower surface of radially extending portion $2c_1$ and an inside surface of axially extending portion $2c_2$ of spring seat portion 2c.

More particularly, first portion 9 of elastic member 28 is fixed to first and second rigid members 1 and 2 by means of vulcanization and second and third portions 7 and 8 are fixed to second rigid member 2 by means of vulcanization. Elastic seat 5 is fixed to spring seat portion 2c by means of vulcanization.

In upper support 40 having the above-described structure, loads from coil spring 20 are transmitted from coil spring 20 through a compression deformation of elastic seat 5 to second rigid member 2 and from second rigid member 2 through a compression deformation of first portion 9 of elastic member 28 to first rigid member 1 and are finally born by vehicle body 23. Loads from absorber rod 11 are divided into two kind of loads, bound loads and rebound loads. In bound loads absorber rod 11 moves upward relative to vehicle body 23 and in rebound loads absorber rod 11 moves downward relative to vehicle body 23. Bound loads are transmitted from absorber rod 11 and an upper portion 19 of a bound stopper 10 to lower retainer 18, from lower retainer 18 through a compression deformation of third portion 8 of elastic member 28 to second rigid member 2, and from second rigid member 28 through a compression deformation of first portion 9 of elastic member 28 to first rigid member 1, and are finally born by vehicle body 23. Rebound loads are transmitted from upper retainer 13 through a compression deformation of second portion 7 of elastic member 28 to second rigid member 2, from second rigid member 2 through a deformation in compression-tension direction (the deformation is maintained in compression due to the force from coil spring 20 and vertical movements of second rigid member 2 are not large) of first portion 9 of elastic member 28 to first rigid member 1, and are finally born by vehicle body 23. Excessively large rebound loads are directly transmitted from upper retainer 13 to first rigid member 1 because a bound stopper clearance becomes zero as will be illustrated hereinafter.

In upper support 40 having elastic member 28 and elastic seat 5 which are used in a compression direction, spring constants of upper support 40 against loads from coil spring 20 and bound loads and rebound loads from absorber rod 11 can be determined independently of each other and are determined as follows: Against loads from coil spring 20:

$$1/K_c = 1/K_9 + 1/K_5$$

Against loads from absorber rod 11:
Against bound loads:

$$1/K_{SB} = 1/K_9 + 1/K_8$$

Against rebound loads:

$$K_{SR} = K_7$$

where:
$K_C$ is a spring constant of upper support 40 against loads from coil spring 20;

$K_{SB}$ is a spring constant of upper support 40 against bound loads from absorber rod 11;

$K_{SR}$ is a spring constant of upper support 40 against rebound loads from absorber rod 11;

$K_5$ is a spring constant in compression of elastic seat 5;

$K_7$ is a spring constant in compression of second portion 7 of elastic member 28;

$K_8$ is a spring constant in compression of third portion 8 of elastic member 28; and $K_9$ is a spring constant in compression of first portion 9 of elastic member 28.

Since the load bearing rubber members of upper support 40 including elastic member 28 and elastic seat 5 are used in compression, durability of upper support 40 is greatly increased. Since the spring constants in compression of first, second and third portions 9, 7 and 8 can be determined independently of each other, the characteristics against loads from coil spring 20, bound loads from absorber rod 11 and rebound loads from absorber rod 11 can be determined independently of each other and can be set to an optimum, respectively. Since elastic member 28 and elastic seat 5 are used in compression and are not required to be increased in hardness of rubber for the purpose of maintaining durability, a ratio of a dynamic spring constant to a static spring constant of rubber is kept low in comparison with that of rubber members of a prior art upper support, the dynamic vibrational characteristic of upper support 40 can be kept as soft as the static vibrational characteristic of upper support 40 and, as a result, good vibration and noise suppression effects can be obtained in upper support 40 of the present invention. Further, since elastic member 28 is not fixed by means of vulcanization to collar 14, collar 14 is not required to be expanded for the purpose of producing a pre-compression at the inner peripheral of a rubber member. This deletion of expansion process of collar 14 decreases manufacturing costs of an upper support.

The vibrational characteristics of elastic member 28 can be set to desirable ones through selecting a length of collar 14 and selecting sizes of radial deformation absorbing means (illustrated hereinafter) without changing or increasing a hardness of rubber of rubber members as follows:

First and second portions 9 and 7 of elastic member 28 are pre-compressed by upper and lower retainers 13 and 18 of the suspension by an amount which is determined by selecting an axial length of collar 14 disposed between upper and lower retainers 13 and 18. By this pre-compression, vibrational characteristics against loads from absorber rod 11 can be adjusted.

First portion 9 of elastic member 28 is integrally connected to second portion 7 which has a considerably large rubber volume and is positioned on a radially inner and obliquely upper side of first portion 9, and first portion 9 is defined by a free surface on a radially outer side of first portion 9. The large rubber volume of second portion 7 and the free surface absorb a radial deformation of first portion 9 caused when first portion 9 is axially deformed between first and second rigid members 1 and 2 and, as a result, help first portion 9 to be deformed in the axial direction by a necessary amount. A volume of second portion 7 and an area of the free surface as well as a height of first portion 9 determine a vibrational characteristic of first portion 9.

Second portion 7 of elastic member 28 has first and second radial deformation absorbing means 24 and 25 at radially inner and outer sections of an upper area of second portion 7, respectively. First radial deformation absorbing means 24 is an obliquely cut surface obliquely extending from an upper surface of second portion 7 to an inner surface of second portion 7. Second radial deformation absorbing means 25 is an annular concave surface opening upwards and formed between second portion 7 and substantially cylindrical portion 1b of first member 1. First and second radial deformation absorbing means 24 and 25 absorb a radial deformation of second portion 7 caused when second portion 8 is axially deformed between second rigid member 2 and upper retainer 13 and, as a result, help second portion 7 to be deformed in the axial direction by a necessary amount. By selecting sizes of first and second radial deformation absorbing means 24 and 25, a vibrational characteristic of second portion 7 can be adjusted in design and manufacture.

Third portion 8 of elastic member 28 has third and fourth radial deformation absorbing means 26 and 27 at radially inner and outer sections of a lower area of third portion 8, respectively. Third radial deformation absorbing means 26 comprises an obliquely cut surface obliquely extending from a lower surface of third portion 8 to an inside surface of third portion 8. Fourth radial deformation absorbing means 27 comprises an annular concave surface opening downward and provided between third portion 8 and substantially cylindrical portion 2b of second rigid member 2. Third and fourth radial deformation absorbing means 26 and 27 absorb a radial deformation of third portion 8 caused when third portion 8 is axially deformed between second rigid member 2 and lower retainer 18 and, as a result, help third portion 8 to be deformed in the axial direction by a necessary amount. By selecting sizes of third and fourth radial deformation absorbing means 26 and 27, a vibrational characteristic of third portion 8 can be adjusted in design and manufacture.

Adjustment of the vibrational characteristics of upper support 40 without increasing a hardness of rubber maintains a dynamic vibrational characteristic of upper support 40 as soft as a static vibrational characteristic, through which a soft and good cushion of a vehicle can be obtained. First through fourth radial deformation absorbing means 24-27 can adjust vibrational characteristics of upper support 40 against bound and rebound loads independently of each other.

Curved portion 1c of first rigid member 1 is covered at a radially outside surface thereof with a first rubber layer 15. First rubber layer 15 is squeezed between curved portion 1c and vehicle body 23 when the suspension is mounted to vehicle body 23. First rubber layer 15 prevents water and dust from invading into an engine room (a space above vehicle body 23 in FIG. 1).

An entire surface of first and second rigid members 1 and 2 except upper and lower surfaces of a radially outer portion of flange portion 1a of first rigid member 1 and a radially inner surface of a lower portion of axially extending portion $2c_2$ of seat portion 2c of second rigid member 2 is covered with rubber members including first, second and third portions 9, 7 and 8 of elastic member 28 and elastic seat 5. Due to this structure, the metal members of upper support 40 including first and second members 1 and 2 are rust-proofed.

An upper end of substantially cylindrical portion 1b of first rigid member 1 is also covered with a rubber member 29. There remains a rebound stopper clearance between an upper surface of rubber member 29 and a lower surface of upper retainer 13. When an excessively large rebound load acts on upper support 40, the rebound stopper clearance becomes zero and the excessively large rebound loads are directly transmitted from upper retainer 13 via rubber member 29 to first rigid member 1.

All members of upper support 40 including first and second rigid members 1 and 2, elastic member 28 and elastic seat 5 are integrally connected to each other to provide a single integrated upper support. Also, all rubber members of upper support 40 including elastic member 28 and elastic seat 5 are integrally connected to each other. Due to this integral structure, mounting of upper support 40 to a vehicle body in a vehicle assembly line becomes easy.

According to the present invention, the following effects can be obtained:

Firstly, since the load bearing rubber members of upper support 40 including first, second and third portions 9, 7 and 8 of elastic member 28 and elastic seat 5 are used in a compression direction, durability of upper support 40 is greatly improved.

Secondly, since elastic member 28 is not used in shear but in compression and the spring constants in compression of first, second and third portions 9, 7 and 8 of elastic member 28 can be adjusted in design and manufacture by only selecting the contours of first, second and third portions 9, 7 and 8, the vibrational characteristics of elastic member 28 against loads from coil spring 20 and loads (including bound and rebound loads) from absorber rod 11 can be easily set to desired ones without taking shear and durability of rubber members into consideration and independently of each other.

Thirdly, since the vibrational characteristics of elastic member 28 can be set to desired ones by only selecting contours of elastic member 28 in design and manufacture without increasing a hardness of rubber itself, a ratio of a dynamic spring constant to a static spring constant is maintained small, which improves a dynamic characteristics of a suspension to provide good cushion and noise-suppression effects.

Fourthly, since elastic member 28 is not fixed to collar 14 by means of vulcanization which induces a shrinkage in rubber and collar 14 is not required to be expanded to provide a pre-compression in rubber, an expansion process of collar 14 which was inevitable in the prior art upper support is deleted from the manufacturing process of an upper support, which decreases manufacturing costs.

Fifthly, since the spring constants in compression of first, second and third portions 9, 7 and 8 of elastic member 28 can be adjusted in design and manufacture independently of each other, it is easy to obtain optimum characteristics against loads from coil spring 20, bound loads and rebound loads from absorber rod 11 independently of each other.

Sixthly, since all members of upper support 40 are integral to provide a single upper support, mounting of upper support 40 to vehicle body 23 in a vehicle assembly line is easy and simple.

Seventhly, since main portions of the metal portions of upper support 40 including first and second rigid members 1 and 2 are covered with rubber members, upper support 40 is rust-proofed.

Finally, since rubber member 15 fixed to the outside surface of curved portion 1c of first rigid member 1 is squeezed between first rigid member 1 and vehicle body 23, rubber member 15 can prevent water and dust from invading an engine room of a vehicle.

Although only one exemplary embodiment of the present invention has been described in detail above, those skilled in the art will readily appreciate that many modifications are possible in the exemplary embodiment without materially departing from the novel teachings and advantages of the invention. Accordingly, all such modifications are intended to be included with the spirit and scope of the present invention as defined in the following claims.

What is claimed is:

1. An upper support for a suspension including a shock absorber and a coil spring located between a vehicle body and a wheel, the upper support being attached to said shock absorber between upper and lower retainers located on opposite sides of a collar coupled to an absorber rod of said shock absorber, said upper support, said shock absorber and said coil spring having a common axis, said upper support comprising:
   a first generally annular rigid member including a substantially cylindrical portion and a flange portion extending radially outward from a lower end portion of said substantially cylindrical portion;
   a second generally annular rigid member arranged below said first rigid member in an axial direction and including: a substantially flat portion extending perpendicular to said axis of said upper support and having an inner diameter smaller than an inner diameter of said first rigid member; a substantially conically extending portion extending obliquely downward from a radially outer end portion of said substantially flat portion and having an outer diameter larger than the inner diameter of said first rigid member; a substantially cylindrical portion extending downward from a lower end portion of said substantially conically extending portion; and a spring seat portion extending generally radially outward from a lower end portion of said substantially cylindrical portion;
   an elastic generally annular member elastically connecting said first and second rigid members, and having a radially inner slidable surface for slidably contacting the collar coupled to the absorber rod of the shock absorber, said elastic member including: a first portion provided between said first rigid member and said substantially conically extending portion of said second rigid member in the axial direction and fixed to said first and second rigid members; a second portion provided above and fixed to said substantially flat portion of said second rigid member, said second portion being compressed in the axial direction between said substantially flat portion of said second rigid member and the upper retainer coupled to the absorber rod; and a third portion provided below and fixed to said substantially flat portion and said substantially conically extending portion of said second rigid member, said third portion being compressed in the axial direction between said substantially flat and substantially conically extending portions of said second rigid member and the lower retainer coupled to the absorber rod; each of said first, second and third portions being used in a compression direction; and
   an elastic seat fixed to a lower surface of said spring seat portion of said second rigid member to receive loads from the coil spring.

2. The upper support according to claim 1, wherein said first portion of said elastic member is fixed to said first and second rigid members by means of vulcanization and said second and third portions of said elastic member are fixed to said second rigid member by means of vulcanization.

3. The upper support according to claim 1, wherein said second and third portions of said elastic member are pre-compressed by the upper and lower retainers by an amount which is determined by selecting an axial length of the collar interposed between the upper and lower retainers.

4. The upper support according to claim 1, wherein said first portion of said elastic member is integrally connected to said second portion, said second portion has a rubber volume relatively larger than a rubber volume of said first portion and is positioned on a radially inner and obliquely upper side of said first portion,
   said first portion includes a free exterior surface on a radially outer side of said first portion, and
   said relatively large rubber volume of said second portion and said free exterior surface of said first portion absorb a radial deformation of said first portion caused when said first portion is axially deformed by said first and second rigid members to assist deformation of said first portion in the axial direction.

5. The upper support according to claim 1, wherein said second portion of said elastic member has first and second radial deformation absorbing means at radially inner and outer sections of an upper area of said second portion, respectively, for absorbing a radial deformation of said second portion caused when said second portion is axially deformed by said second rigid member and the upper retainer to assist deformation of said second portion in the axial direction.

6. The upper support according to claim 1, wherein said third portion of said elastic member has third and fourth radial deformation absorbing means at radially inner and outer sections of a lower area of said third portion, respectively, for absorbing a radial deformation of said third portion caused when said third portion is axially deformed by said second rigid member and the lower retainer to assist deformation of said third portion in the axial direction.

7. The upper support according to claim 5, wherein said first radial deformation absorbing means comprises a cut surface obliquely extending downward between an upper surface of said second portion and the radially inner surface of said second portion of said elastic member.

8. The upper support according to claim 5, wherein said second radial deformation absorbing means comprises an annular concave surface opening upward and provided radially between said second portion of said elastic member and said substantially cylindrical portion of said first rigid member.

9. The upper support according to claim 6, wherein said third radial deformation absorbing means comprises a cut surface obliquely extending upward between a lower surface of said third portion and the radially inner surface of said third portion of said elastic member.

10. The upper support according to claim 6, wherein said fourth radial deformation absorbing means comprises a concave surface opening downward and provided between said third portion of said elastic member and said substantially cylindrical portion of said second rigid member.

11. The upper support according to claim 1, wherein said first rigid member further comprises a curved portion which connects said substantially cylindrical portion of said first rigid member and said flange portion of said first rigid member, said curved portion being covered at an exterior surface thereof with a rubber layer compressed between said curved portion and a vehicle body when said suspension is mounted to a vehicle body.

12. The upper support according to claim 1, wherein upper and lower surfaces of a radially outer portion of said flange portion of said first rigid member and a radially inside surface of a lower portion of an axially extending portion of said spring seat portion of said second rigid member are exposed, the remaining surfaces of said first and second rigid members being covered with said first, second and third portions of said elastic member, said elastic seat and rubber members.

13. The upper support according to claim 1, wherein an upper end of said substantially cylindrical portion of said first rigid member is covered with a rubber member, and an upper surface of said rubber member and a lower surface of the upper retainer define a rebound stopper clearance therebetween in the axial direction.

14. The upper support according to claim 1, wherein said first and second rigid members, said elastic member and said elastic seat are integrally connected to each other to form a single integral upper support.

15. The upper support according to claim 1, wherein said elastic member and said elastic seat are integrally connected to each other to form a single integral rubber member.

* * * * *